(12) United States Patent
Thomas et al.

(10) Patent No.: US 7,057,810 B2
(45) Date of Patent: Jun. 6, 2006

(54) MICROSTRUCTURED SCREEN WITH LIGHT ABSORBING MATERIAL AND METHOD OF MANUFACTURING

(75) Inventors: Patrick A. Thomas, Maplewood, MN (US); John C. Nelson, The Sea Ranch, CA (US); Scott M. Tapio, Falcon Heights, MN (US); Michael L. Graetz, Stillwater, MN (US); Amy J. Gates, Cottage Grove, MN (US); Peter M. Olofson, Oakdale, MN (US); Robert L. Brott, Woodbury, MN (US); Robert S. Moshrefzadeh, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/733,066

(22) Filed: Dec. 11, 2003

(65) Prior Publication Data

US 2005/0128579 A1  Jun. 16, 2005

(51) Int. Cl.
*G03B 21/56* (2006.01)
*G03B 21/60* (2006.01)
*C03C 15/00* (2006.01)

(52) U.S. Cl. .................... 359/443; 359/454; 359/459; 216/95

(58) Field of Classification Search ........ 359/453–454, 359/456–457, 459–460, 443; 216/95
See application file for complete search history.

(56) References Cited

U.S. PATENT DOCUMENTS

| | | |
|---|---|---|
| 5,104,929 A | 4/1992 | Bilkadi |
| 5,126,189 A | 6/1992 | Tanny et al. |
| 5,128,387 A | 7/1992 | Shustack et al. |
| 5,462,700 A | 10/1995 | Beeson et al. |
| 5,481,385 A * | 1/1996 | Zimmerman et al. ......... 349/62 |
| 5,521,726 A * | 5/1996 | Zimmerman et al. ......... 349/96 |
| 5,609,990 A | 3/1997 | Ha et al. |
| 5,633,049 A | 5/1997 | Bilkadi et al. |
| 6,417,966 B1 | 7/2002 | Moshrefzadeh et al. |
| 6,636,355 B1 * | 10/2003 | Moshrefzadeh et al. .... 359/460 |
| 2002/0080484 A1 | 6/2002 | Moshrefzadeh et al. |
| 2003/0027886 A1 | 2/2003 | Novicky |
| 2003/0139549 A1 | 7/2003 | Savu et al. |
| 2003/0139550 A1 | 7/2003 | Savu et al. |
| 2003/0224688 A1 | 12/2003 | Sugimoto et al. |
| 2004/0265602 A1 | 12/2004 | Kobayashi et al. |

FOREIGN PATENT DOCUMENTS

| | | |
|---|---|---|
| EP | 0 484 073 A | 5/1992 |
| EP | 0 595 702 | 5/1994 |
| EP | 0 851 246 | 7/1998 |
| EP | 1 491 946 A1 | 12/2004 |
| JP | 57 080025 | 5/1982 |
| JP | 04 078841 | 3/1992 |
| JP | 04 299329 | 10/1992 |
| JP | 04 350638 | 12/1992 |
| JP | 09 207237 | 8/1997 |
| WO | WO03/077026 | 9/2003 |

* cited by examiner

*Primary Examiner*—W. B. Perkey
*Assistant Examiner*—Magda Cruz
(74) *Attorney, Agent, or Firm*—Robert S. Moshrefzadel; George W. Jonas

(57) ABSTRACT

A film for a screen has a light transmitting substrate and a plurality of structures disposed on the substrate. An optical material at least partially fills cavities between the structures. A method of forming a film includes providing a light transmitting substrate having a plurality of structures disposed thereon and at least partially filling the cavities therebetween with an optical material.

23 Claims, 4 Drawing Sheets

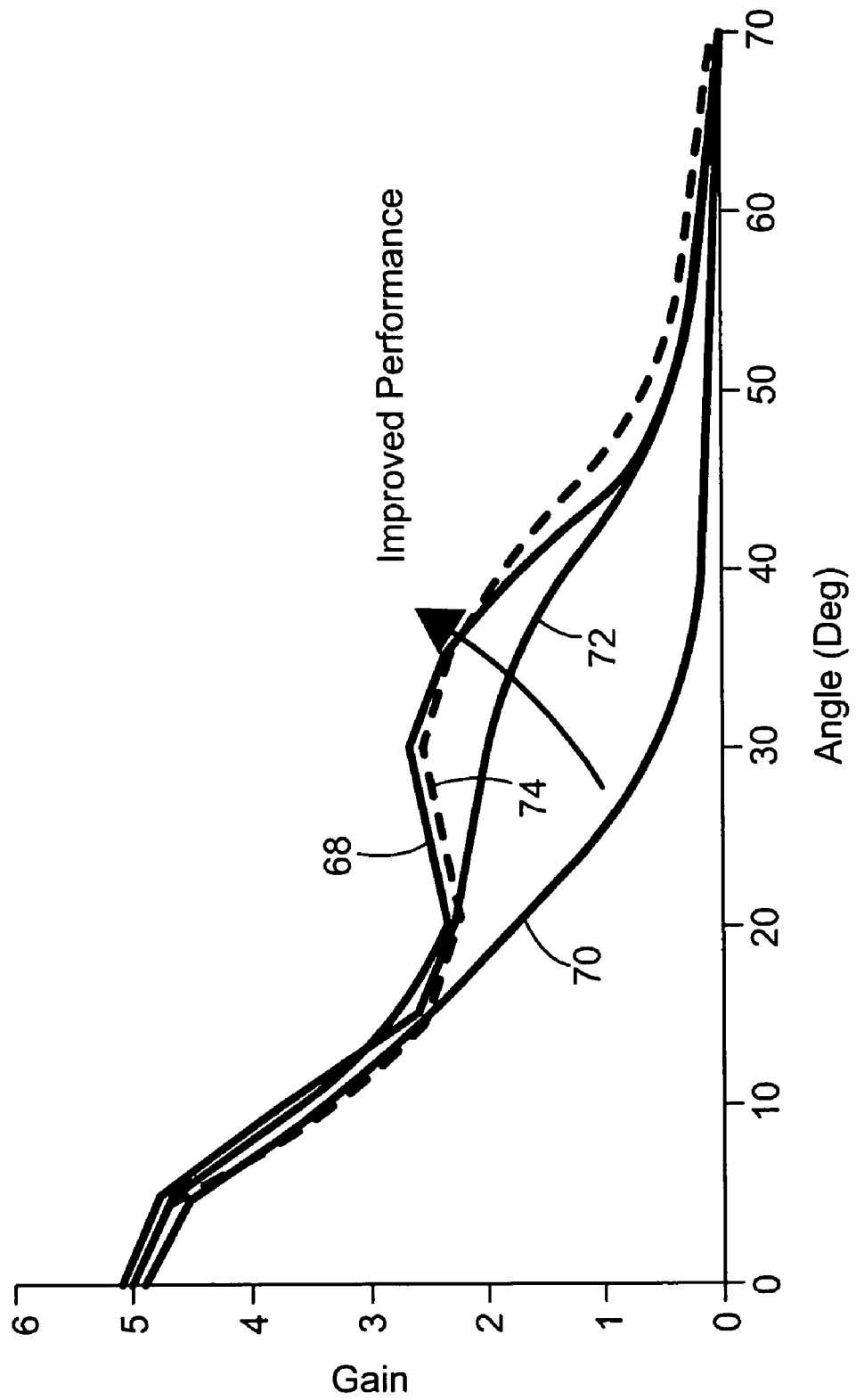

MICROSTRUCTURED SCREEN WITH LIGHT ABSORBING MATERIAL AND METHOD OF MANUFACTURING

CROSS-REFERENCE TO RELATED APPLICATION(S)

This application incorporates by reference co-pending applications Ser. No. 10/733,479, filed Dec. 11, 2003, entitled "Composition for Microstructured Screens" by Peter M. Olofson et al. and Ser. No. 10/732,993, filed Dec. 11, 2003, entitled "Microstructured Screen and Method of Manufacturing Using Coextrusion" by Kathryn M. Spurgeon et al.

BACKGROUND OF THE INVENTION

The present invention is directed generally to methods for manufacturing a rear projection screen and the resulting screen. More particularly, the invention relates to a rear projection screen that incorporates totally internally reflecting structures to disperse the light passing through the screen.

Rear projection screens are generally designed to transmit an image projected onto the rear of the screen into a viewing space. The viewing space of the projection system may be relatively large (e.g., rear projection televisions), or relatively small (e.g., rear projection data monitors). The performance of a rear projection screen can be described in terms of various characteristics of the screen. Typical screen characteristics used to describe a screen's performance include gain, viewing angle, resolution, contrast, the presence of undesirable artifacts such as color and speckle, and the like.

It is generally desirable to have a rear projection screen that has high resolution, high contrast and a large gain. It is also desirable that the screen spread the light over a large viewing space. Unfortunately, as one screen characteristic is improved, one or more other screen characteristics often degrade. For example, the horizontal viewing angle may be changed in order to accommodate viewers positioned at a wide range of positions relative to the screen. However, increasing the horizontal viewing angle may also result in increasing the vertical viewing angle beyond what is necessary for the particular application, and so the overall screen gain is reduced. As a result, certain tradeoffs are made in screen characteristics and performance in order to produce a screen that has acceptable overall performance for the particular rear projection display application.

In U.S. Pat. No. 6,417,966, incorporated herein by reference, Moshrefzadeh et al. disclose a screen having reflecting surfaces disposed so as to reflect light passing therethrough into at least one dispersion plane. The screen thereby permits asymmetric dispersion of image light in a rear projection system and allows the light to be selectively directed towards the viewer. Moshrefzadeh et al. also teach methods for manufacturing the screen, including combinations of steps using casting and curing processes, coating techniques, planarization methods, and removing overcoating materials.

BRIEF SUMMARY OF THE INVENTION

The present invention is a simple and economical method for manufacturing high-performance rear projection screens with internal reflection, and such projection screens. A light dispersing film for a screen has a light transmitting substrate and a plurality of light diffusive structures disposed on the substrate. A light absorbing material at least partially fills cavities between the light diffusive structures. A method of forming a light dispersing film includes providing a light transmitting substrate having a plurality of light diffusive structures disposed thereon, the structures defining a plurality of cavities therebetween, and at least partially filling the cavities with a light absorbing material.

BRIEF DESCRIPTION OF THE DRAWINGS

The present invention will be further explained with references to the drawing figures below, wherein like structure is referred to by like numerals throughout the several views.

FIG. 6 is a graph illustrating screen performance based on a variety of black adhesive formulations.

Figure 1:
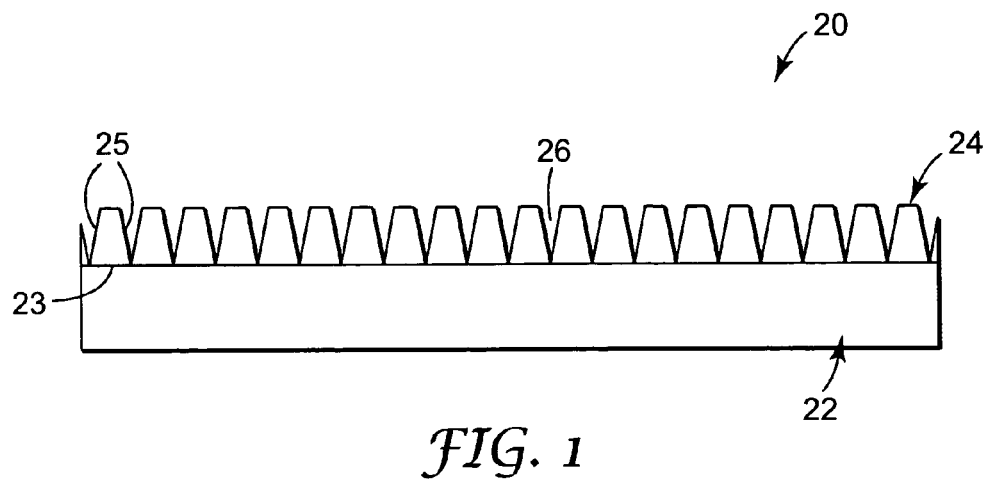
FIG. 1 is a side elevation view of a microrib screen structure.

While the above-identified drawing figures set forth several embodiments of the invention, other embodiments are also contemplated. This disclosure presents illustrative embodiments of the present invention by way of representation and not limitation. Numerous other modifications and embodiments can be devised by those skilled in the art which fall within the scope of spirit of the principles of this invention. The drawing figures are not drawn to scale.

Moreover, while the embodiments are referred to by the designations "first," "second," "third," etc., it is to be understood that these descriptions are bestowed for convenience of reference and do not imply an order of preference. The designations are presented merely to distinguish between different embodiments for purposes of clarity.

DETAILED DESCRIPTION

FIG. 1 is a side elevation view of a microrib screen structure. Variations of the illustrated embodiments can be utilized for front projection and other screen applications, but they will be described primarily with reference to rear projection screen applications for the purposes of this disclosure. Microrib structure 20 includes a light transmitting base substrate 22 and microstructured diffusive ribs 24. The term "microstructured" includes features having characteristic dimensions measured in micrometers ($\mu$m) or smaller units. In general, microstructured features may have characteristic dimensions ranging from less than 0.01 $\mu$m to more than 100 $\mu$m. What constitutes a characteristic dimension of a feature depends on the type of feature. Examples include the width of trough-like features in a surface, the height of post-like protrusions on a surface, and the radius of curvature at the point of sharp protrusions or indentions on a surface. Thus, even a macroscopic feature can be said to be microstructured if a characteristic dimension of the feature has dimensions with sub-micrometer tolerances.

In one exemplary embodiment, linear ribs or microribs 24 are formed of an optical-grade host material such as a resin; in particular, the resin incorporates light scattering particles such as beads so that ribs 24 act as a bulk diffuser. A sufficiently high aspect ratio is chosen for the rib geometry in order to induce total internal reflection (TIR) in the microrib structure 20. The loading of the light scattering particles within the resin is chosen to control optical properties such as gain and view angle of the screen. A material such as a resin with a high refractive index (RI) is generally chosen for diffusive ribs 24. In this application, the RI of a rib 24 refers to the RI of the host material. Examples of suitable host materials for light diffusive ribs 24 include polymers such as modified acrylics, polycarbonate, polystyrene, polyester, polyolefin, polypropylene, and other optical polymers preferably having a refractive index equal to or greater than about 1.50. In the embodiment shown in FIG. 1, the light diffusive ribs 24 are separated by V-shaped cavities or grooves 26. While light diffusive structures 24 are described in an exemplary embodiment as ribs that extend across substantially the entire width of base substrate 22, it is also contemplated that the structures 24, in an alternative embodiment, form discrete peaks that can be arranged upon base substrate 22 in a staggered, or "checkerboard" pattern, for example. In an exemplary embodiment, each structure 24 has a base 23 and a plurality of walls 25 which narrow the structure 24 as walls 25 extend from base 23.

Figure 2:
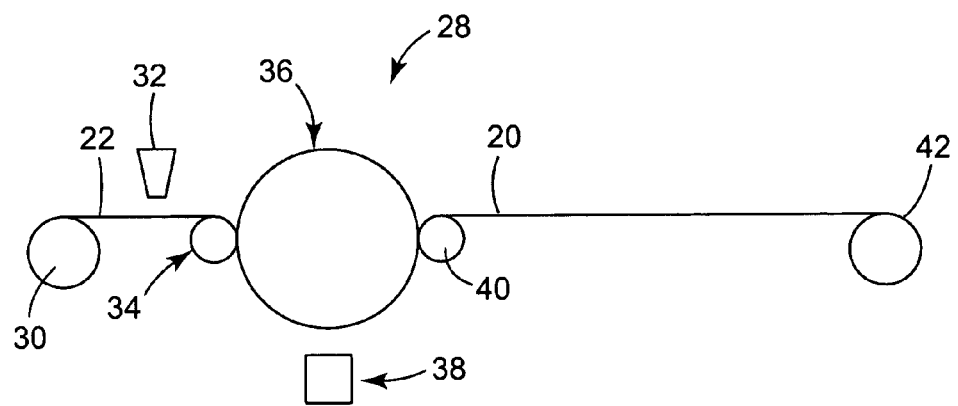
FIG. 2 is a diagram of one embodiment of a method of the present invention for producing the structure of FIG. 1.

FIG. 2 is a diagram of one embodiment of a method for producing the structure of FIG. 1. A process for producing the screen structure 20 of FIG. 1 includes a microreplication process 28 to produce diffusive ribs 24 on base substrate 22. The term "microreplication" includes a process whereby microstructured features are imparted from a master or a mold onto an article. The master is provided with a microstructure, for example by micro-machining techniques such as diamond turning, laser ablation or photolithography. The surface or surfaces of the master having the microstructure may be covered with a hardenable material so that when the material is hardened, an article is formed that has a negative replica of the desired microstructured features. The microreplication may be accomplished using rolls, belts, and other apparatuses known in the art. Microreplication can be accomplished by techniques including but not limited to extruding, embossing, radiation curing and injection molding. Microreplication process 28 uses substrate unwind station 30, resin coating station 32, precision nip roll 34, microstructured cylinder 36, ultraviolet lamp 38, precision nip roll 40 and film rewind 42.

Base substrate 22 is first unwound from substrate unwind station 30. Base substrate 22 is guided to pass into microreplication process 28 resin coating station 32, where the base is coated with a high refractive index resin incorporating light scattering particles. The base substrate 22 and light diffusive material coating are pressed by precision nip roll 34 against microstructured cylinder 36 to impart the ribbed structure to the light diffusive material. The cast structure is then cured by ultraviolet lamp 38 and microribbed structure 20 emerges from precision nip roll 40, resulting in the monolithic structure illustrated in FIG. 1. A cured microrib structure 20 emerges from precision nip roll 40 to be wound upon film rewind 42.

Figure 3:
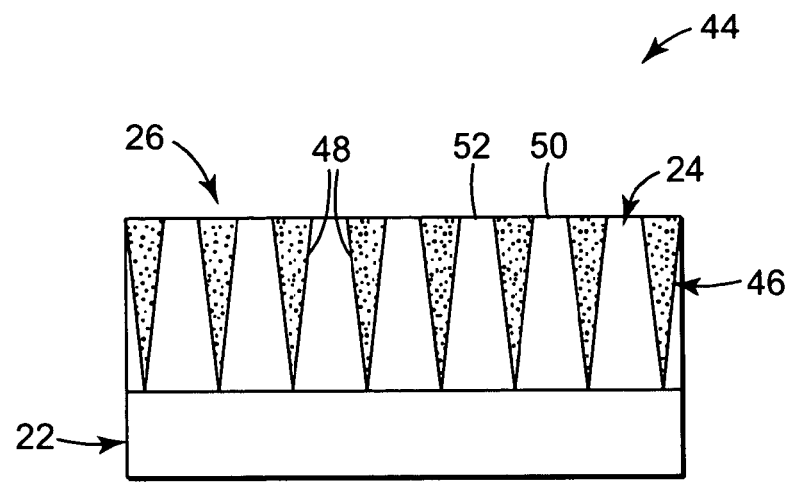
FIG. 3 is a side elevation view of the structure of FIG. 1 filled with light-absorbing material.

FIG. 3 is a side elevation view of the structure of FIG. 1 filled with light-absorbing material 46. Embedded microstructured film 44 includes filling material 46. Material 46 typically incorporates a black pigment or dye to absorb ambient light and improve contrast in the final screen construction. Optical material 46 has a low refractive index so that a relatively high difference in refractive index exists between light absorbing material 46 and the material composing light diffusive ribs 24. A refractive index difference of at least about 0.06 is desired. Such a difference induces efficient internal reflection and high screen performance. Internally reflecting surfaces 48 are formed by the interfaces between light diffusive ribs 24 and light absorbing material 46. In one exemplary embodiment, front surface 50 of embedded microstructured film 44 is a smooth or slightly matte surface with minimal land on the rib top surfaces 52. Totally internally reflecting surfaces 48 disperse light through optically transmitting areas 52 of front surface 50. Front surface 50 preferably has a matte surface finish that assists in scattering the light propagating therethrough.

Figure 4:
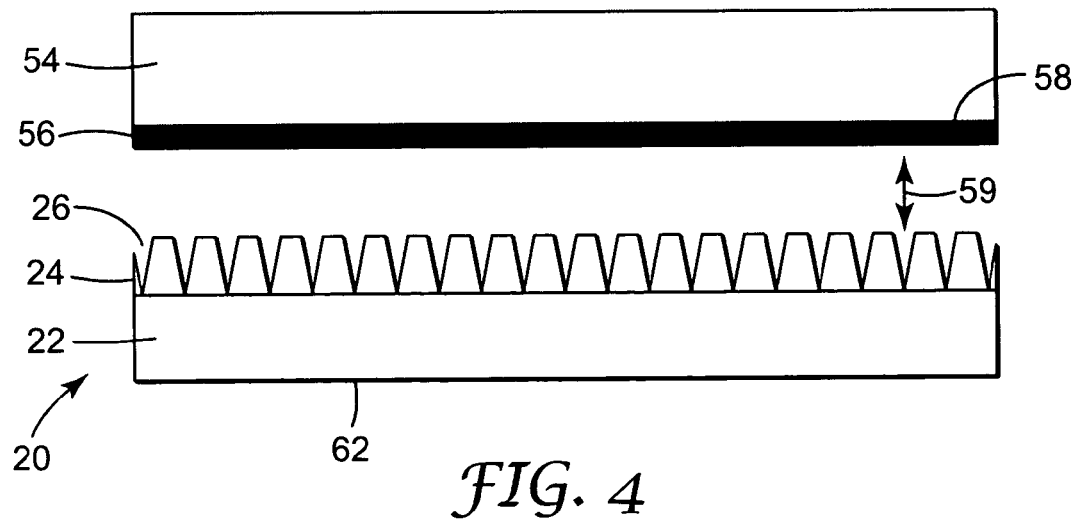
FIG. 4 one method of the present invention for filling the structure of FIG. 1 to produce the structure of FIG. 3.

FIG. 4 is a side elevation view of one method of the present invention for filling the structure of FIG. 1 to produce the structure 44 of FIG. 3. In one embodiment of the method of the present invention, microrib structure 20 is formed by the microreplication process 28 discussed above with respect to FIG. 2 to impart light diffusive ribs 24 having V-shaped grooves 26 onto base structure 22. The process shown in FIG. 4 uses a light absorbing adhesive 56 which possesses both light absorbing and adhesive functionalities. The term "adhesive" used with reference to light absorbing adhesive 56 need not be an adhesive in the normal sense, but needs only to have bonding capabilities with light diffusive ribs 24, and also to shielding substrate or shield 54 if used. By combining the light absorption and adhesive functions in one material, savings in materials and manufacturing steps are obtained. Light absorbing adhesive 56 is disposed on rear surface 58 of shield 54. Shield 54, with light absorbing adhesive 56 disposed thereon, is brought together with microrib structure 20. As shown by arrow 59, for example, shield 54 and microrib structure 20 are laminated together.

The thickness of light transmitting base film 22 can be chosen to meet the requirements of each particular application. For example, a thin base film with a thickness of about 0.127 mm (5 mils) to about 0.254 mm (10 mils) can be chosen to provide for ease of manufacturing; alternatively, a thick film with a thickness of about 0.508 mm (20 mils) to about 1.016 mm (40 mils) can be chosen to provide additional product stiffness. Suitable materials include polycarbonate, polyester, acrylic and vinyl films, for example. In one exemplary embodiment, back surface 62 of base substrate 22 has a matte finish to reduce specular reflection back into the imaging system.

Light transmitting shield 54 is a protective layer that can be a film or sheet made of transparent material such as acrylic, polycarbonate or glass, for example. Shield 54 functions as a protective element so that the coated microstructured film 44 is not damaged by contact. Shield 54 is an optional component, though most applications benefit greatly from this protection. Shield 54 can be made to be anti-glare (matte), anti-reflective, anti-static, anti-scratch or smudge resistant, for example, through coatings, surface textures, or other means. In one embodiment, shield 54 is a 3 millimeter thick acrylic panel from Cyro Corporation with a non-glare, matte outward-facing surface. Shield 54 can also be varied to provide for different functionalities. Shield 54 can range in thickness from thin (less than about 0.508 mm (20 mils)) to semi-rigid (about 0.508 mm (20 mils) to about 1.016 mm (40 mils)) to rigid (greater than about 1.016 mm (40 mils)). The thicknesses of base substrate 22 and protective shield 54 can be chosen to yield a wide variety of products with these options impacting total material cost, optical functionality, and ease of processing.

In one exemplary embodiment, light absorbing adhesive 56 is a photopolymerizable, low refractive index material which adheres to both light diffusive ribs 24 and shield 54. In an exemplary embodiment, the refractive indices of light diffusive ribs 24 and light absorbing adhesive 56 differ enough to cause total reflection rather than transmittance at the interface therebetween. In an exemplary embodiment, the refractive index of the microrib material of light diffusive ribs 24 varies from 1.49 for simple acrylate materials to 1.58 or higher for materials such as aromatic polycarbonates. The refractive index requirement for the groove filler material 56 is, therefore, dependent on the optical properties (such as refractive index) of the microrib 24 material. For the high refractive index microrib materials, such as polycarbonate, commercially available photolaminating adhesives may be adequate. Exemplary adhesives 56 have a RI of less than about 1.50. Particularly suitable adhesives 56 have a RI of less than about 1.45. In some embodiments, adhesive 56 is a pigmented blend of one or more of the following components: urethane acrylate oligomers; substituted acrylate, diacrylate, and triacrylate monomers; fluorinated acrylates; perfluoroalkylsulfonamidoalkyl acrylates; acrylated silicones; acrylated silicone polyureas, and UV or visible light activated photoinitiators.

If the viscosity of the groove filler adhesive 56 is too low, it will flow during the groove filling process. This can waste material, give nonuniform thickness, and contaminate the process equipment. If the viscosity is too high, filling the grooves 24 can be a slow, difficult process and the possibility of introducing bubbles (optical defects) increases significantly. While photolamination can be accomplished with fluids having viscosities as low as about 150 centipoises, many processes can benefit from a viscosity of at least about 400 centipoises before polymerization. While viscosities as high as about 5,000 centipoises before polymerization can be used, viscosities no higher than about 1,500 centipoises before polymerization are especially suitable for reasonable process speed and bubble-free coatings.

A standard measure of adhesion between substrates and coatings is the amount of force required to separate them, known as the peel force. The peel force of a system containing excellent interfacial adhesion at the interface between layers will be very high. While peel force strength of at least about 35.71 kg/m (2 pounds/inch) is probably adequate between polycarbonate diffusive ribs 24 and light absorbing adhesive 56, it is more desirable to have peel force of at least about 71.42 kg/m (4 pounds/inch). This high peel force should be maintained under environmental test conditions of high temperature and humidity. Adequate adhesion may be achieved by modification of the substrate surfaces by treatment, such as with corona discharge or plasma, or priming; it is preferred, however, that the adhesive 56 adhere to the light diffusive ribs 24 and shield 54, if used, without the necessity of surface modification.

One suitable embodiment of light absorbing adhesive 56 is constructed by warming the following resin components to about 70° C. (158° F.) to lower the viscosity sufficiently to allow for agitation: 16.0 g aliphatic urethane acrylate oligomer; 19.0 g ethoxyethoxyethyl acrylate; 5.5 g hexanediol diacrylate; 5.0 g tetrahydrofurfuryl acrylate; 44.5 g N-methyl-perfluorobutylsulfonamidoethyl acrylate; 10.0 g acryloyloxyethoxyperfluorobutane; and 1.0 g phenyl bis(2, 4,6 trimethyl benzoyl) phosphine oxide photoinitiator.

The components are then shaken until a clear solution results. The solution is then pigmented for light absorption. One suitable pigment is carbon black; in one embodiment, the pigment is used in a concentration between about 50 ppm (parts per million) and about 20,000 ppm; in one exemplary embodiment, the pigment is used in a concentration greater than about 1000 ppm and less than about 9000 ppm. A concentration of about 3000 ppm is particularly suitable, based on mass ratios of the carbon black material to the resin material. In one embodiment, the formulation is disposed onto shield 54 by a conventional method such as knife coating. The coated shield is then pressed onto microrib structure 20 as shown in FIG. 4, for example, to partially or completely fill grooves 26. Excess adhesive 56, if any, is expelled by running a rubber roller over the construction. The construction is passed under a 11.81 W/mm (300 Watt/in) Fusion Systems D lamp one or more times at about 6.1 m (20 feet) per minute. In an alternate method, the formulation may be coated directly onto the microrib structure 20, and shield 54 then adhered to the microrib structure 20 with adhesive 56 already disposed thereon. Thereafter, the steps of removing excess adhesive 56 and curing the construction are the same as discussed above.

Figure 5A:
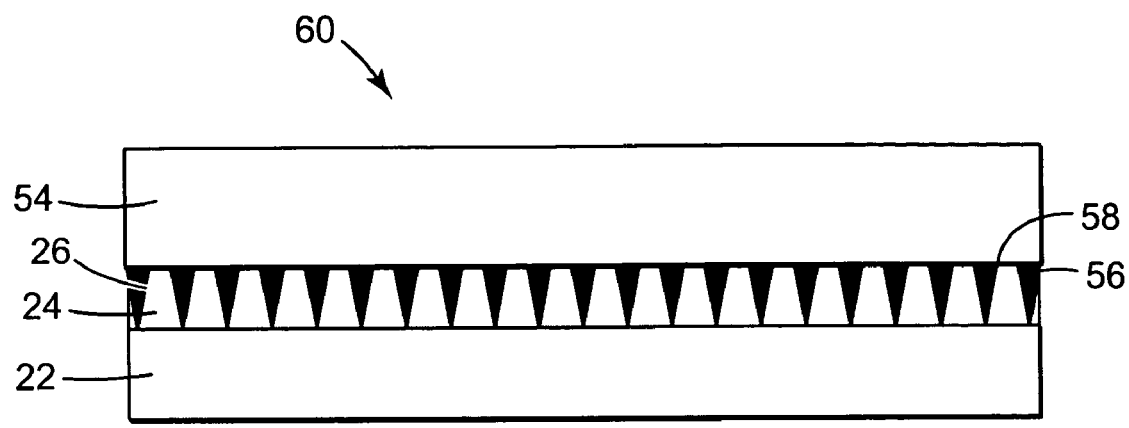
FIG. 5A is a side elevation view of one embodiment of a screen produced by the method of FIG. 4.

FIG. 5A is a side elevation view of one embodiment of a screen produced by the method of FIG. 4. The step of FIG. 4 can result in a completely filled structure 60. In one exemplary embodiment, light absorbing adhesive 56 has a low refractive index to produce efficient TIR within ribs 24. Light absorbing adhesive 56 is formulated to effectively bond diffuser ribs 24 to shield 54. Light absorbing adhesive 56 can possess low shrinkage properties to produce a cosmetically acceptable lamination result. Moreover, it is particularly suited that light absorbing adhesive 56 is curable by ultraviolet light in order to allow for convenient processing and a fast cure. In one embodiment, substrate 22 and protective shield 54 are individually flexible, but completely filled structure 60 is rigid.

In one embodiment, light diffusive ribs 24 are replicated from a tooling mold using a high refractive index diffuser resin, as shown in microreplication process 28 of FIG. 2. In this application, all percentages are by mass unless otherwise indicated. One suitable resin is about 79% aliphatic urethane acrylate oligomer and about 19% 2-phenoxyethyl acrylate, and about 2% 2-hydroxy-2-methyl-1-phenyl-1-propanone photoinitiator. Another suitable resin is about 69% aliphatic urethane acrylate oligomer, about 29% 2-(1-naphthyloxy)-ethyl acrylate and about 2% 2-hydroxy-2-methyl-1-phenyl-1-propanone photoinitiator. The resin for forming ribs 24 is coated from resin coating station 32 onto substrate or base structure 22. Base structure 22 with resin thereon is molded by microstructured cylinder 36 and cured by ultraviolet (UV) lamps or electron beams 38. Typical UV cure conditions use a 23.62 W/mm (600 Watt/in) Fusion Systems D bulb system, operated at belt speeds of about 3.05 m (10 feet) to about 6.10 m (20 feet) per minute, with one or more passes under the UV Bulb. The formed microrib structure 20 is removed from microreplication process 28, yielding a self-supporting structure.

Then, a pigmented, typically black, light absorbing adhesive 56 can be applied to a second substrate such as shield 54. One suitable light absorbing adhesive 56 is formed from a resin having about 30% "Formulation A" (the "Formulation A" having about 38.5% aliphatic urethane acrylate oligomer, about 26.9% ethoxyethoxyethyl acrylate, about 28.8% isobornyl acrylate, about 5.8% hexanediol diacrylate and about 1% α,α-diethoxyacetophenche (DEAP) photoinitiator); about 10% aliphatic urethane diacrylate; about 30% trifluoroethyl acrylate; and about 30% N-methyl-perfluorobutylsulfonamidoethyl acrylate. Another suitable light absorbing material 56 is formed from a resin having about 50% "Formulation A," discussed above, and about 50% N-methyl-perfluorobutylsulfonamidoethyl acrylate. In one exemplary embodiment, light absorbing adhesive 56 contains a pigment such as carbon black. In one exemplary embodiment, the pigment is used in a concentration between about 50 ppm (parts per million) and about 20,000 ppm. In one exemplary embodiment, the pigment is used in a concentration greater than about 1,000 ppm and less than about 9,000 ppm. A concentration of about 3,000 ppm is particularly suitable, based on mass ratios of the carbon black material to the adhesive material.

Light absorbing adhesive 56 is applied to a second substrate such as shield 54 in sufficient quantity to completely fill diffuser ribs 24, allowing a slight excess to ensure complete fill, in the lamination method illustrated in FIG. 4. The excess adhesive squeezes out of completely filled structure 60 upon lamination. Completely filled structure 60 is then exposed to radiation under conditions similar to those discussed above for microreplication process 28. The exposure can, for example, result in a partial or complete polymerization of the material. After at least partial polymerization, light absorbing adhesive 56 is a copolymer of its components.

Figure 5B:
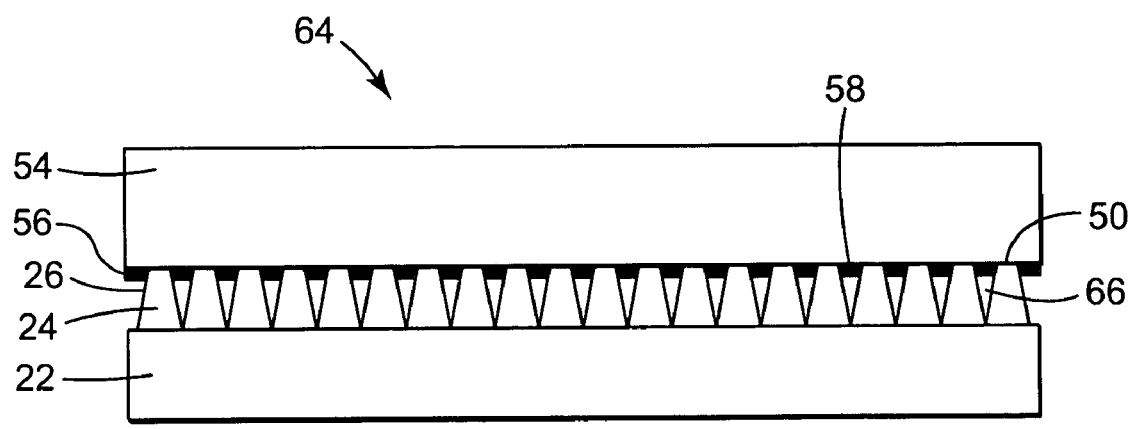
FIG. 5B is a side elevation view of a second embodiment of a screen produced by the method of FIG. 4.

FIG. 5B is a side elevation view of a second embodiment of a screen produced by the method of FIG. 4. When a small thickness or amount of light absorbing adhesive 56 is used in the step illustrated in FIG. 4, partially filled structure 64 results. In partially filled structure 64, air gaps 66 are left in V-shaped grooves 26. A benefit of air gap 66 is that the low refractive index air fills the rib grooves 26 and creates a large refractive index difference between the grooves 26 and the light diffusive ribs 24, further enhancing "TIR efficiency". Because the refractive index of air is 1.0, the difference in refractive index between air gap 66 and light diffusive ribs 24 is usually greater than about 0.5. Because air gap 66 creates the bulk of the diffuser rib interface, light absorbing adhesive 56 need not possess as low a refractive index as when the ribs are completely filled in structure 60. This allows for the selection of an adhesive 56 to optimize other important properties, such as low shrinkage and high peel strength adhesion, for example. Since the adhesive contact area between light absorbing adhesive 56 and diffuser ribs 24 is smaller, light absorbing adhesive 56 may possess greater adhesive properties in partially filled structure 64 than completely filled structure 60. In one embodiment, substrate 22 and protective shield 54 are individually flexible, but partially filled structure 64 is rigid.

In both completely filled structure 60 and partially filled structure 64, the level of light absorbing material used in light absorbing adhesive 56 is chosen based on the desired amount of contrast enhancement and ambient light absorption. The light absorbing material in an exemplary embodiment is a black pigment such as carbon black. In completely filled structure 60, the black pigment concentration can be relatively low and yet yield an acceptable total fixed absorbence, or optical density value, because the thickness of the layer of light absorbing adhesive 56 is large. A suitable loading concentration of pigment such as carbon black in completely filled structure 60 in one embodiment is between about 50 ppm (parts per million) and about 20,000 ppm. In an exemplary embodiment, the concentration is greater than about 1000 ppm and less than about 9000 ppm. A concentration of about 3000 ppm is particularly suitable, based on mass ratios of the carbon black material to the adhesive material. However, in partially filled structure 64, the coating thickness is small; therefore, the black pigment concentration must be larger to yield the same optical density. In the latter case, the ambient light absorption is larger per unit of coating thickness than in the former case. A suitable loading concentration of pigment such as carbon black in partially filled structure 64 in one embodiment is between about 50 ppm and about 20,000 ppm. In an exemplary embodiment, the concentration is greater than about 5,000 ppm and less than about 10,000 ppm, based on mass ratios of the carbon black material to the adhesive material.

A challenge in both completely filled structure 60 and partially filled structure 64 is the removal of excess adhesive 56 from front surface 50 of diffuser ribs 24 during lamination. If all of the light absorbing adhesive 56 is not removed from front surface 50 of the diffuser ribs 24 during lamination, some image light can be lost due to absorption during TIR transmission. In a partially filled structure 64 with more highly pigmented adhesive 56, more loss of image light can occur for the same residual black layer thickness.

FIG. 6 is a graph illustrating screen performance based on a variety of black adhesive formulations. One way of gauging screen performance is by plotting the horizontal gain curve as a function of viewing angle. The plotted curves describe the brightness of the screen perceived by a viewer as the viewer moves sideways away from the center of the screen. "TIR efficiency" relates to the range of incident light angles that result in total internal reflection; the greater the range, the higher the efficiency. Reflection from the rib 24 sides can produce a local maximum in the gain curve as shown. As both the TIR efficiency and RI difference increase, the secondary peak in the gain curve (near 30 degrees horizontal viewing angle)can increase. The effect of a local maximum can be reduced or eliminated by, for example, introducing light diffusion into the projection screen. For example, ribs 24 may include particles to make the local maximum less pronounced by scattering any incident light.

Curve 68 refers to a benchmark standard screen using a standard planarization technique for filling cavities 26 with light absorbing material. The benchmark standard screen has light diffusive ribs 24 formed from a resin having about 80% aliphatic urethane acrylate oligomer and about 20% 2-phenoxyethyl acrylate. Light diffusive ribs 24 have a refractive index of about 1.51. Light absorbing material 46 is formed from a resin having about 60% proprietary RC709 silicone acrylate from Goldschmidt Corp., about 39% propoxylated neopentyl glycol diacrylate, and about 1% Darocur 4265 (a 1:1 blend of 2-hydroxy-2-methyl-1-phenyl-1-propanone and diphenyl (2,4,6-trimethylbenzoyl)-phosphine oxide) photoinitiator with carbon black pigment in a concentration of about 3,000 ppm. Light absorbing material 46 has a refractive index of about 1.45. The RI difference between light absorbing material 46 and light diffusive ribs 24 is about 0.06. This formulation of light absorbing material 46 possesses low shrinkage characteristics, good processing properties, uniform dispersion of the black pigment, low price and widespread availability.

Curve 70 refers to a screen formed by the method illustrated in FIGS. 4 and 5A which shows the gain when the RI difference between diffuser ribs 24 and light absorbing adhesive 56 is less than about 0.01. The screen corresponding to curve 70 has light diffusive ribs 24 formed from a resin having about 80% aliphatic urethane acrylate oligomer and about 20% 2-phenoxyethyl acrylate. Light diffusive ribs 24 have a refractive index of about 1.51. Light absorbing material 56 is formed from a "Formulation A" resin having about 38.5% aliphatic urethane acrylate oligomer; about 26.9% ethoxyethoxyethyl acrylate; about 28.8% isobornyl acrylate; about 5.8% hexanediol diacrylate; and about 1% α,α-diethoxyacetophenone (DEAP) photoinitiator. Light absorbing material 56 has a refractive index of about 1.50.

Curve 72 refers to a screen formed by the method illustrated in FIGS. 4 and 5A which has increased "TIR efficiency" when a light absorbing adhesive 56 with relatively low RI is used. The screen corresponding to curve 72 has light diffusive ribs 24 formed from a resin having about 80% aliphatic urethane acrylate oligomer and about 20% 2-phenoxyethyl acrylate. Light diffusive ribs 24 have a refractive index of about 1.51. Light absorbing material 56 is formed from a resin having about 30% "Formulation A," discussed above; about 10% aliphatic urethane diacrylate; about 30% trifluoroethyl acrylate; about 30% N-methyl-perfluorobutyl-sulfonamidoethyl acrylate; and about 1% α,α-diethoxyacetophenone (DEAP) photoinitiator. Light absorbing adhesive 56 has a refractive index of about 1.44.

Finally, curve 74 refers to a screen formed by the method illustrated in FIGS. 4 and 5A, in which the TIR efficiency is increased, where the RI difference between light absorbing adhesive 56 and light diffusive ribs 24 is about 0.08. The screen corresponding to curve 74 has light diffusive ribs 24 formed from a resin having about 70% aliphatic urethane acrylate oligomer and about 30% 2-(1-naphthyloxy)-ethyl acrylate. Light diffusive ribs 24 have a refractive index of about 1.5338. Light absorbing material 46 is formed from a resin having about 50% "Formulation A," discussed above; about 50% N-methyl-perfluorobutylsulfonamidoethyl acrylate; and about 1% α,α-diethoxyacetophenone (DEAP) photoinitiator. Light absorbing material 56 has a refractive index of about 1.45.

As shown in FIG. 6, the formulation of light absorbing adhesive 56 relative to the formulation of light diffusive ribs 24 can be chosen to produce the desired screen performance characteristics. Usually, the formulations are chosen to maximize the RI difference between light absorbing adhesive 56 and light diffusive ribs 24. It is desirable for light absorbing adhesive 56 to achieve strong adhesion to light diffusive ribs 24 and protective shield 54, possess a relatively low RI, have high mechanical strength after curing, and processability properties such as appropriate viscosity and curability by ultraviolet light. A suitable component of light absorbing material 56 is an aliphatic urethane acrylate oligomer. In some embodiments, light absorbing adhesive 56 contains at least about 5 percent of an aliphatic urethane acrylate oligomer. In an exemplary embodiment, light absorbing adhesive 56 contains at least about 10 percent of an aliphatic urethane acrylate oligomer. In some embodiments, light absorbing adhesive 56 contains less than about 50 percent of an aliphatic urethane acrylate oligomer. In an exemplary embodiment, light absorbing adhesive 56 contains less than about 40 percent of an aliphatic urethane acrylate oligomer. If the concentration of aliphatic urethane acrylate oligomer is too low, light absorbing adhesive 56 may not be viscous enough; if the concentration is too high, light absorbing adhesive 56 may be too viscous, and the refractive index may be too high.

Another suitable component of light absorbing adhesive 56 is a low RI compatible acrylate monomer, of which ethoxyethoxyethyl acrylate is an example. In some embodiments, light absorbing adhesive 56 contains at least about 1 percent of an acrylate monomer. In an exemplary embodiment, light absorbing adhesive 56 contains at least about 8 percent of an acrylate monomer. In some embodiments, light absorbing adhesive 56 contains less than about 30 percent of an acrylate monomer. In an exemplary embodiment, light absorbing adhesive 56 contains less than about 20 percent of an acrylate monomer. In an exemplary embodiment, the acrylate monomer has a low RI and serves as a solvent to enhance the compatibility of the other components of light absorbing adhesive 56.

Another suitable component of light absorbing material 56 is a multifunctional acrylate monomer to add strength, of which hexanediol diacrylate is an example. In some embodiments, light absorbing adhesive 56 contains at least about 0.1 percent of a multifunctional acrylate monomer. In an exemplary embodiment, light absorbing adhesive 56 contains at least about 1.0 percent of a multifunctional acrylate monomer. In some embodiments, light absorbing adhesive 56 contains less than about 10 percent of a multifunctional acrylate monomer. In an exemplary embodiment, light absorbing adhesive 56 contains less than about 6 percent of a multifunctional acrylate monomer. The higher the functionality of the multifunctional acrylate monomer, the lower the required concentration.

The screen with "Formulation A" light absorbing adhesive 56, illustrated by curve 70, has too high a RI to provide efficient TIR. One compatible component for decreasing the RI of light absorbing adhesive 56 is a perfluoroalkylsulfonamidoethyl acrylate, of which N-methyl-perfluorobutylsulfonamidoethyl acrylate is an example. In some embodiments, light absorbing adhesive 56 contains at least about 1 percent of a perfluoroalkylsulfonamidoethyl acrylate. In an exemplary embodiment, light absorbing adhesive 56 contains at least about 10 percent of a perfluoroalkylsulfonamidoethyl acrylate. In some embodiments, light absorbing adhesive 56 contains less than about 70 percent of a perfluoroalkylsulfonamidoethyl acrylate. In an exemplary embodiment, light absorbing adhesive 56 contains less than about 50 percent of a perfluoroalkylsulfonamidoethyl acrylate.

Where light absorbing material 56 is photopolymerized, a suitable photoinitiator is included; phenyl bis(2,4,6 trimethyl benzoyl) phosphine oxide photoinitiator and α,α-diethoxyacetophenone (DEAP) photoinitiator are examples of suitable free radical photoinitiators. In some embodiments, light absorbing adhesive 56 contains at least about 0.5 percent of a photoinitiator. In an exemplary embodiment, light absorbing adhesive 56 contains about 1.0 percent of a photoinitiator. In some embodiments, light absorbing adhesive 56 contains less than about 5 percent of a photoinitiator. In other embodiments, a thermal polymerization or redox initiator is chosen.

Although the present invention has been described with reference to exemplary embodiments, workers skilled in the art will recognize that changes may be made in form and detail without departing from the spirit and scope of the invention. For example, while particular shapes for light diffusive and light absorbing structures are illustrated, it is contemplated that the structures may be formed in different shapes, incorporating additional or different planes or angles, additional edges, and curved surfaces. It is further noted that the light diffusive structures on a particular substrate need not all be of the same height or shape, for example. Similarly, the light absorbing structures on a particular substrate need not all be of the same height or shape, for example. Moreover, components of the materials and processes described therein are combinable in numerous ways; only a few of those possibilities have been specifically described by way of example, although all are regarded to be within the scope of the invention.

The invention claim is:
1. A method of forming a film comprising:
   providing a first flexible light transmitting substrate having opposite first and second major surfaces, the first surface having a plurality of structures defining a plurality of cavities therebetween;

providing a second flexible substrate having opposite first and second major surfaces and an optical adhesive material disposed on the first surface of the second substrate; and laminating the first flexible light transmitting substrate to the plurality of structures by bringing the first surfaces of the first and second flexible substrates together so that the optical adhesive material at least partially fills the cavities, the lamination resulting in a rigid film.

2. The method of claim 1 in which the optical adhesive material is light absorbing.

3. The method of claim 1 in which:
the plurality of structures comprise a host material that has a first refractive index; and
the optical adhesive material has a second refractive index, the second refractive index being less than the first refractive index.

4. The method of claim 3 in which:
the first light transmitting substrate has a third refractive index, the third refractive index being greater than the second refractive index.

5. The method of claim 3 in which a difference between the first refractive index and the second refractive index is at least about 0.06.

6. The method of claim 1 in which the second substrate is a shield.

7. The method of claim 1 in which the step of laminating the first flexible light transmitting substrate to the plurality of structures includes completely filling the cavities with the optical adhesive material.

8. The method of claim 1 in which each structure is light diffusive.

9. A film for a screen comprising:
a light transmitting flexible substrate;
a plurality of structures disposed on the substrate, the structures defining a plurality of cavities therebetween;
a flexible shielding substrate disposed proximate the plurality of structures; and
an optical adhesive disposed between the shielding substrate and the plurality of structures, the optical adhesive at least partially filling the cavities, wherein the combination of the light transmitting flexible substrate and the flexible shielding substrate is rigid.

10. The film of claim 9 further comprising air partially filling the cavities.

11. The film of claim 9 in which the plurality of structures have a first refractive index and the optical adhesive has a second refractive index, the second refractive index being less than the first refractive index.

12. The film of claim 11 in which a difference between the first refractive index and the second refractive index is at least about 0.06.

13. The film of claim 9 in which the optical adhesive completely fills the cavities.

14. The film of claim 9 in which each structure has a base and a plurality of walls which narrow the structure as the walls extend from the base.

15. The film of claim 14 in which each structure is a rib.

16. The film of claim 9 in which the light transmitting substrate comprises a first material and the plurality of structures comprise the first material and a plurality of light diffusing particles.

17. The film of claim 9 in which the optical adhesive includes a black pigment.

18. The film of claim 9 in which each structure is light diffusive.

19. The film of claim 9 in which the optical adhesive is light absorbing.

20. A method of forming a film comprising:
providing a light transmitting flexible substrate having a plurality of structures disposed thereon, the structures defining a plurality of cavities therebetween; and
laminating a flexible shielding substrate to the plurality of structures, by at least partially filling the cavities with an optical adhesive disposed between the shielding substrate and the plurality of structures, the lamination resulting in a rigid film.

21. The method of claim 20 in which the plurality of structures have a first refractive index and the optical adhesive has a second refractive index, the second refractive index being less than the first refractive index.

22. The method of claim 21 in which a difference between the first refractive index and the second refractive index is at least about 0.06.

23. The method of claim 20 in which the step of filling the cavities includes completely filling the cavities with the optical adhesive.

* * * * *

UNITED STATES PATENT AND TRADEMARK OFFICE
CERTIFICATE OF CORRECTION

PATENT NO. : 7,057,810 B2
APPLICATION NO. : 10/733066
DATED : June 6, 2006
INVENTOR(S) : Patrick A. Thomas It is certified that error appears in the above-identified patent and that said Letters Patent is hereby corrected as shown below:

Column 2
Line 21, delete "FIG. 4 one" and insert -- FIG. 4 is one --, therefor.

Column 6
Line 58, delete "$\alpha$, $\alpha$-diethoxyacetophenche" and insert
-- $\alpha$, $\alpha$-diethoxyacetophenone --, therefor.

Column 12
Line 29 in Claim 20, after "structures" delete ",".

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,057,810 B2  
APPLICATION NO. : 10/733066  
DATED : June 6, 2006  
INVENTOR(S) : Patrick A. Thomas Page 1 of 1

It is certified that error appears in the above-identified patent and that said Letters Patent is hereby corrected as shown below:

Column 2  
Line 21, delete "FIG. 4 one" and insert -- FIG. 4 is one --, therefor.

Column 6  
Line 58, delete "α, α-diethoxyacetophenche" and insert -- α, α-diethoxyacetophenone --, therefor.

Column 12  
Line 29 in Claim 20, after "structures" delete ",".

This certificate supersedes Certificate of Correction issued November 21, 2006.

Signed and Sealed this

Second Day of January, 2007

JON W. DUDAS  
*Director of the United States Patent and Trademark Office*